Sept. 21, 1926.
B. F. SCHMIDT
1,600,430
LUBRICANT DISTRIBUTOR
Filed July 24, 1923
2 Sheets-Sheet 1
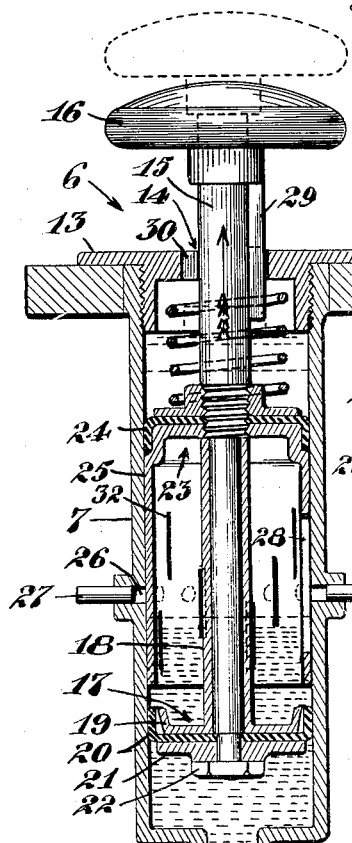
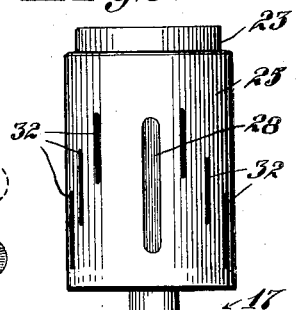
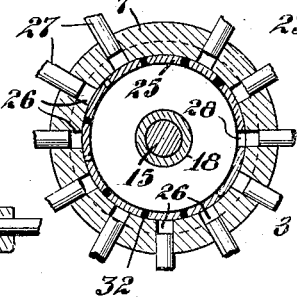
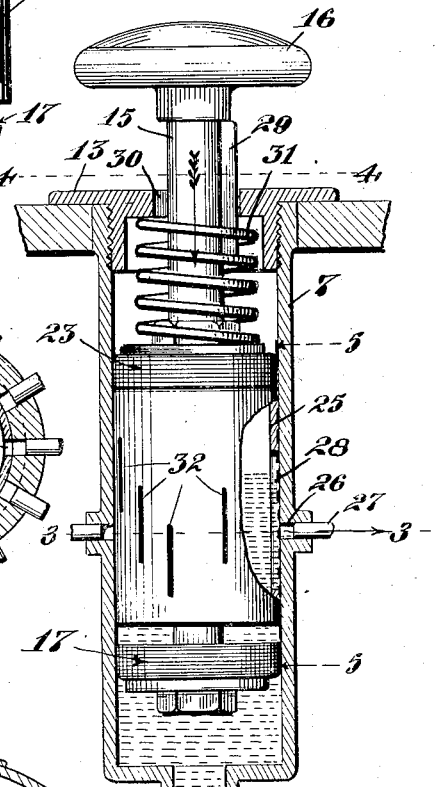
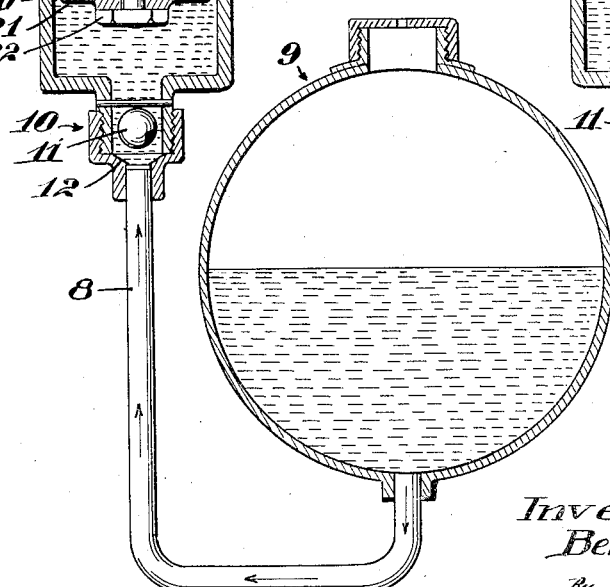
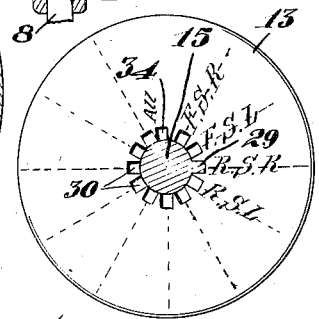
Inventor.
Benjamin F. Schmidt
By R. S. Berry
Attorney.

Sept. 21, 1926.

B. F. SCHMIDT 1,600,430

LUBRICANT DISTRIBUTOR

Filed July 24, 1923    2 Sheets-Sheet 2

INVENTOR.
Benjamin F. Schmidt
BY
R. S. Berry
ATTORNEY.

Patented Sept. 21, 1926.

1,600,430

UNITED STATES PATENT OFFICE.

BENJAMIN F. SCHMIDT, OF LOS ANGELES, CALIFORNIA, ASSIGNOR, BY DIRECT AND MESNE ASSIGNMENTS, OF ONE-THIRD TO RICHARD C. KLEPPER AND ONE-THIRD TO JOSEPH H. CREWS, BOTH OF LOS ANGELES, CALIFORNIA.

LUBRICANT DISTRIBUTOR.

Application filed July 24, 1923. Serial No. 653,434.

My invention particularly pertains to a lubricant distributor in which a lubricant may be delivered from a suitable source of supply to any one of a plurality of parts to be lubricated.

An object of my invention is to provide a lubricant distributor ejector adapted to be operated to withdraw a charge of lubricant from a reservoir, in which selective means are provided whereby the charge of lubricant may be delivered to any one of a number of points of discharge.

Another object is to provide a selective valve embodied in a lubricant ejector and adapted to be operated to direct the discharge of the lubricant through various lines of discharge.

A further object is to provide a lubricant distributor which is adapted to be installed on a vehicle, and operated to deliver a lubricant to various parts of the vehicle as occasion may require.

With the foregoing objects in view, together with such other objects and advantages as may subsequently appear, my invention resides in the parts, and in the construction, combination and arrangement of parts hereinafter described and claimed and illustrated by way of example in the accompanying drawings, in which:—

Figure 1 is a view in vertical section of the lubricant distributor and selective valve showing it as associated diagrammatically with a lubricant reservoir and illustrating the parts as arranged substantially in their normal position in readiness for operation.

Fig. 2 is a view in vertical section, partly in elevation, of the lubricant distributor and selective valve, showing the parts as disposed in effecting delivery of the lubricant.

Fig. 3 is a detail in horizontal section as seen on the line 3—3 of Fig. 2.

Fig. 4 is a detail in horizontal section as seen on the line 4—4 of Fig. 2.

Fig. 5 is a view in elevation of the selective valve and ejector piston as seen on the line 5—5 of Fig. 2, with the cup leathers removed.

Figure 6:
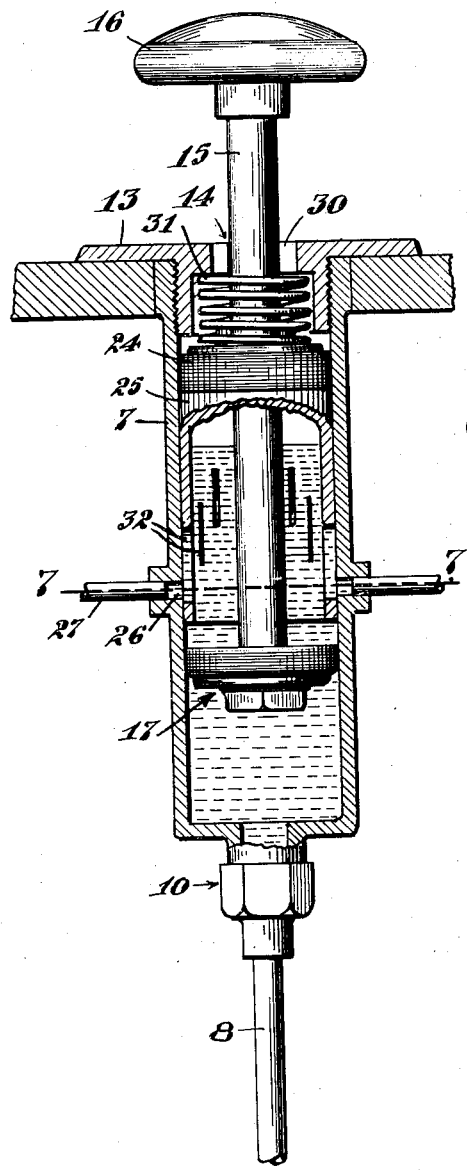
Fig. 6 is a view in section and elevation of the lubricant distributor showing the selective valve as positioned to deliver lubricant through a plurality of discharge conduits at the same time.

More specifically, 6 indicates the lubricant ejector which is in the form of a pump, and embodies a cylindrical casing 7, one end of which connects with a lubricant feed pipe 8, leading from a suitable reservoir 9 adapted to contain a fluid or semi-fluid lubricant. A check valve 10 is provided between the casing 7 and the reservoir, here shown as located in the coupling connecting the casing 7 and the pipe 8, and embodies a ball 11 adapted to seat on an inclined shoulder 12 in the coupling to close communication between the reservoir and casing on back pressure being formed in the latter.

The end of the casing opposite the valve 10 is fitted with a cap 13 having a central opening 14 through which extends a stem 15 having a hand-hold 16 on its outer end by means of which the stem may be manually reciprocated. Carried on the stem interiorly of the casing is a piston 17 here shown as comprising a sleeve 18 carried on the stem 15, having a flange 19 on which is seated a cup leather 20, held in place on the flange 19 by a washer 21, which washer is caused to bear on the cup leather opposite the flange 19 by a nut 22 screwed on the end of the stem 15. This piston 17 is adapted, on outward movement, to draw lubricant into the casing 7 from the reservoir 9.

Fixedly mounted on the stem 15 in spaced relation to piston 17 is a plunger 23, provided with a cup leather 24 which extends opposite to the cup leather 20 on the piston 17. The plunger is adapted on inward movement thereof to effect discharge from the casing of lubricant drawn into the casing by the piston 17.

An annular apron 25 constituting a selective valve is formed on the plunger 23 and slidably conforms to the inner periphery of the casing.

The casing 7 is formed with a series of discharge openings 26 arranged in alignment circumferentially of the casing, and spaced suitable distances apart, and communicating with the discharge openings are conduits 27 which lead to suitable points of discharge located at the parts to be lubricated, not necessary to be here shown.

Formed in the valve 25 is a longitudinally extending slot 28, which is adapted to be positioned by rotating the valve 25 so as to register with either of the discharge openings 26; the slot 28 being elongated so as to maintain communication between a discharge opening and the interior of the casing during longitudinal movement of the valve.

As a means for determining the position of the slot 28 and to enable its being disposed in register with any one of the discharge openings 26 the stem 15 is provided with a longitudinally extending rib 29 which is adapted to be engaged with any one of a series of radial slots 30 formed on the margin of the opening 14 in the cap 13. There is a radial slot 30 provided on the plane of the center of each discharge opening 26. The rib 29 is here shown as disposed on the stem 15 to project from the side thereof corresponding to that on which the elongated slot 28 in the valve is located. The rib 29 is adapted to be engaged with either of the slots 30, by moving the stem 15 outwardly such distance that the end of the rib will clear the outer face of the cap 13 so as to permit rotation of the stem.

It will now be seen that when the stem 15 is retracted as indicated in dotted lines in Fig. 1 so that the rib 29 will be clear of the cap 13 the stem may be rotated to position the rib 29 so that on advance movement of the stem the rib will enter any one of the slots 30 as the operator may elect. By reason of the relation of the rib 29 to the slot 28 and of the radial slots 30 to the discharge openings 26 the slot 28 will be disposed to register with the discharge opening on the plane of the radial slot engaged by the rib when the stem is advanced.

In the operation of the invention retraction of the stem 15 will cause the piston 17 to draw a charge of lubricant from the reservoir into the casing where the charge will be positioned between the piston 17 and the check valve 10. On advancing the stem 15 and piston 17 the charge located between the piston and the check valve will flow around the cup leather 20 into the space between the piston 17 and the plunger 23 so that when the piston 17 reaches its advanced position the charge of lubricant will be located on the outer side of the piston so that when the stem and piston are again retracted the charge of lubricant will be carried by the piston 17 interiorly of the valve 25 from whence the charge will be ejected on advance movement of the stem by action of the plunger 23 through the slot 28 and the particular discharge opening 26 registering therewith. Each reciprocation of the stem 15 will thus draw a charge of lubricant from the reservoir and eject a previous charge through a discharge opening 26 and conduit 27 to the part to be lubricated.

In order to enable the operator to determine the point of discharge of the lubricant, the outer face of the cap 13 is provided with indicia adjacent the radial slots 30 indicating the parts to which the discharge conduits 27 lead. For example where the device is applied to an auto vehicle and has conduits leading to the front and rear springs on the right and left hand sides of the vehicle, the cap 13 will be provided with indicia as indicated in Fig. 4 to denote the radial slot with which the rib 29 must be engaged to effect delivery of the lubricant to the desired spring. In like manner other of the radial slots may be designated according to the parts to which the lubricant is to be delivered.

As the valve 25 maintains all of the discharge openings of 26 closed excepting the discharge opening registering with the valve slot 28 the lubricant in the valve will be discharged only through the selected conduit.

By the construction here shown a single valve serves to control the discharge of the lubricant through any one of any desired number of conduits.

If desired, a coil spring 31 may be interposed between the plunger 23 and the cap 13, which spring will be placed under tension on retracting the plunger and will operate to automatically advance the plunger slowly where a slow feed of lubricant is desired. However, the operator by bearing on the hand-hold 16 may augment the advance movement of the plunger where a rapid discharge of lubricant is required.

Figure 7:
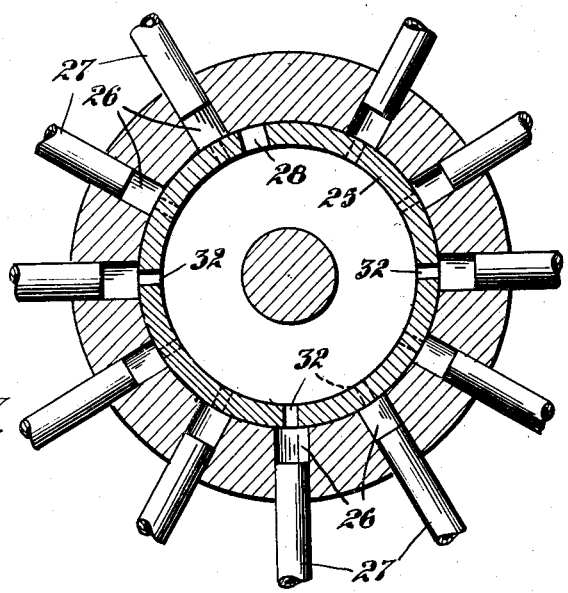
Fig. 7 is an enlarged detail section as seen on the line 7—7 of Figure 6.

The construction and operation just described, is employed, as above stated, where it is desired to deliver the lubricant to but one of any number of points of discharge. Means are provided, however, whereby the selective valve may be set and utilized so as to deliver lubricant simultaneously to a plurality of points of discharge on advance movement of the plunger. To accomplish this purpose the valve apron 25 is formed with a series of longitudinal slots 32 arranged to effect communication between the interior of ejector and the discharge openings 26; the slots 32 being so spaced around the periphery of the sleeve that when the slot 28 is in register with an opening 26, the slots 32 will be positioned on a plane extending intermediate adjacent discharge outlets 26, as particularly shown in Figure 3; but by positioning the valve so that the slot 28 will be disposed to one side of one of the discharge openings 26 in which position the slot 28 will be closed, the openings 32 will be located so as to be disposed opposite the discharge outlets 26, so that on advance movement of the plunger, lubricant will be discharged through a plurality of the discharge outlets. To enable the proper position of the selective valve to open the slots 32 to the discharge outlets, a radial slot 34 is provided in the cap 13 at such a point that when the rib 29 is positioned therein, the slots 32 will be positioned on planes extending through the discharge outlets. The parts will then be positioned as shown in Figures 6 and 7.

Figure 8:
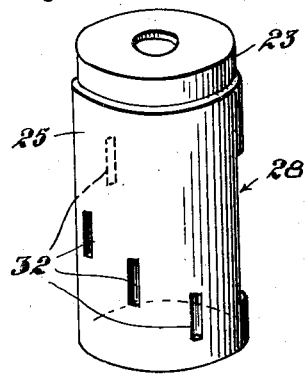
Fig. 8 is a perspective view of a modified form of selective valve.

It may be desirable not to effect opening of all of the discharge openings through the slots 32 at one time, but to effect opening of one or more of the slots successively on advance movement of the selective valve. For this purpose, a number of the slots are staggered longitudinally of the valve apron, as shown in Fig. 8. On the other hand, in some instances, the slots 32 may correspond substantially in length to the slot 28 so as to effect discharge of the lubricant through all of the discharge openings simultaneously.

A particular advantage to be derived by the use of my invention resides in the facility with which the operator may set the selective valve to direct the lubricant to any desired point of discharge, so as to direct the lubricant either to any one of a number of points of discharge or to deliver it simultaneously to a plurality of points of discharge.

An important feature of the invention resides in the fact that the operator can effect delivery of any desired amount of lubricant from the reservoir to any one point of discharge by imparting to the ejector a suitable number of strokes to deliver the required amount of the lubricant.

Another important feature resides in the fact that any desired degree of pressure may be applied in ejecting the lubricant according to varying conditions, as in some instances the discharge conduits may lead to parts to which the lubricant may be fed at low pressure while other conduits may lead to parts of such character as to require considerable pressure to deliver the lubricant thereto.

The spring 31 will serve to feed the lubricant at low pressure, but when it is desired to effect feed of the lubricant at a pressure exceeding that developed by the spring 31, the plunger may be manually depressed to impart the desired pressure to the lubricant.

I claim:—

1. In a lubricant distributor, a casing provided with a lubricant inlet and having a side wall formed with a plurality of lubricant outlets, a piston rotatably and reciprocally mounted in said casing, a valve carried by said piston adapted to open and close said outlets; said valve being formed with a series of longitudinally staggered ports adapted to successively open and close a series of said outlets throughout a single piston stroke.

2. In a lubricant distributor, a casing provided with a lubricant inlet and having a side wall formed with a plurality of lubricant outlets, a piston rotatably and reciprocally mounted in said casing, a valve carried by said piston adapted to open and close said outlets; said valve being formed with a series of longitudinally staggered ports adapted to successively open and close a series of said outlets throughout a stroke of the piston, and said valve being further provided with an elongated port adapted to selectively open any one of said outlets; said staggered ports being so arranged relative to the elongated port that when said last named port is open to an outlet the remaining outlets will be closed.

3. In a lubricant distributor, a casing provided with a lubricant inlet and a plurality of lubricant outlets, a reciprocal stem extending into said casing, a pair of spaced opposed cup leathers carried by said stem, and a valve carried by said stem located between said cup leathers, said valve being adapted to open and close said outlets.

4. In a lubricant distributor, a casing provided with a lubricant inlet and a plurality of lubricant outlets, a reciprocal piston within said casing, a valve carried by said piston for opening and closing said outlets, said piston and valve cooperating to successively direct lubricant through said outlets on a single down-stroke of the piston, and means for exerting a yieldable pressure on said piston operable to automatically effect down-stroke of the latter.

BENJAMIN F. SCHMIDT.